United States Patent
Imanishi et al.

(10) Patent No.: US 9,956,885 B2
(45) Date of Patent: May 1, 2018

(54) FUEL CELL SYSTEM, FUEL CELL VEHICLE, AND CONTROL METHOD FOR FUEL CELL SYSTEM

(71) Applicant: TOYOTA JIDOSHA KABUSHIKI KAISHA, Toyota-shi, Aichi-ken (JP)

(72) Inventors: Hiroyuki Imanishi, Toyota (JP); Kazuo Yamamoto, Toyota (JP); Masashi Toida, Nagoya (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 167 days.

(21) Appl. No.: 14/936,908

(22) Filed: Nov. 10, 2015

(65) Prior Publication Data
US 2016/0133965 A1    May 12, 2016

(30) Foreign Application Priority Data
Nov. 12, 2014    (JP) .................. 2014-229867

(51) Int. Cl.
| | |
|---|---|
| H01M 8/04 | (2016.01) |
| B60L 11/18 | (2006.01) |
| H01M 16/00 | (2006.01) |
| H01M 8/04746 | (2016.01) |
| H01M 8/04089 | (2016.01) |
| H01M 8/04223 | (2016.01) |

(Continued)

(52) U.S. Cl.
CPC ....... B60L 11/1851 (2013.01); B60L 11/1883 (2013.01); B60L 11/1885 (2013.01); B60L 11/1892 (2013.01); B60L 11/1898 (2013.01); H01M 8/04089 (2013.01); H01M 8/04225 (2016.02); H01M 8/04231 (2013.01); H01M 8/04302 (2016.02); H01M 8/04753 (2013.01); H01M 16/006 (2013.01); H01M 2250/20 (2013.01); Y02T 90/32 (2013.01)

(58) Field of Classification Search
CPC ......... H01M 8/04201; H01M 8/04776; H01M 8/04753; H01M 8/04302; H01M 8/04395
See application file for complete search history.

(56) References Cited

U.S. PATENT DOCUMENTS

2012/0077102 A1* 3/2012 Morita .............. H01M 8/04388 429/429

FOREIGN PATENT DOCUMENTS

| CA | 2 836 555 | 11/2012 |
|---|---|---|
| EP | 2 712 015 A1 | 3/2014 |

(Continued)

*Primary Examiner* — Stewart A Fraser
*Assistant Examiner* — Rachel L Zhang
(74) *Attorney, Agent, or Firm* — Finnegan, Henderson, Farabow, Garrett & Dunner, LLP

(57) ABSTRACT

A fuel cell system includes: a power supply circuit including a fuel cell and a secondary battery; an oxidant gas supply flow passage; a pump; and a control unit configured to drive the pump and dilute hydrogen retained in an cathode. The control unit is configured to stop supplying an oxidant gas to the cathode by stopping an operation of the pump such that dilution of the hydrogen retained in the cathode is stopped, while the fuel cell vehicle remains stationary after a starter switch of the fuel cell vehicle is switched from an off state to an on state, or while a load required of the power supply circuit remains smaller than a predetermined value after the starter switch of the fuel cell vehicle is switched from the off state to the on state.

10 Claims, 14 Drawing Sheets

(51) Int. Cl.
*H01M 8/04302* (2016.01)
*H01M 8/04225* (2016.01)

(56) References Cited

FOREIGN PATENT DOCUMENTS

| | | |
|---|---|---|
| JP | 2007-280804 | 10/2007 |
| JP | 2007-294294 A | 11/2007 |
| JP | 2007-317472 | 12/2007 |
| JP | 2007-317474 | 12/2007 |
| JP | 2008-21485 | 1/2008 |
| JP | 2011-014465 A | 1/2011 |

* cited by examiner (HYDROGEN CONCENTRATION NO MORE THAN 4%)

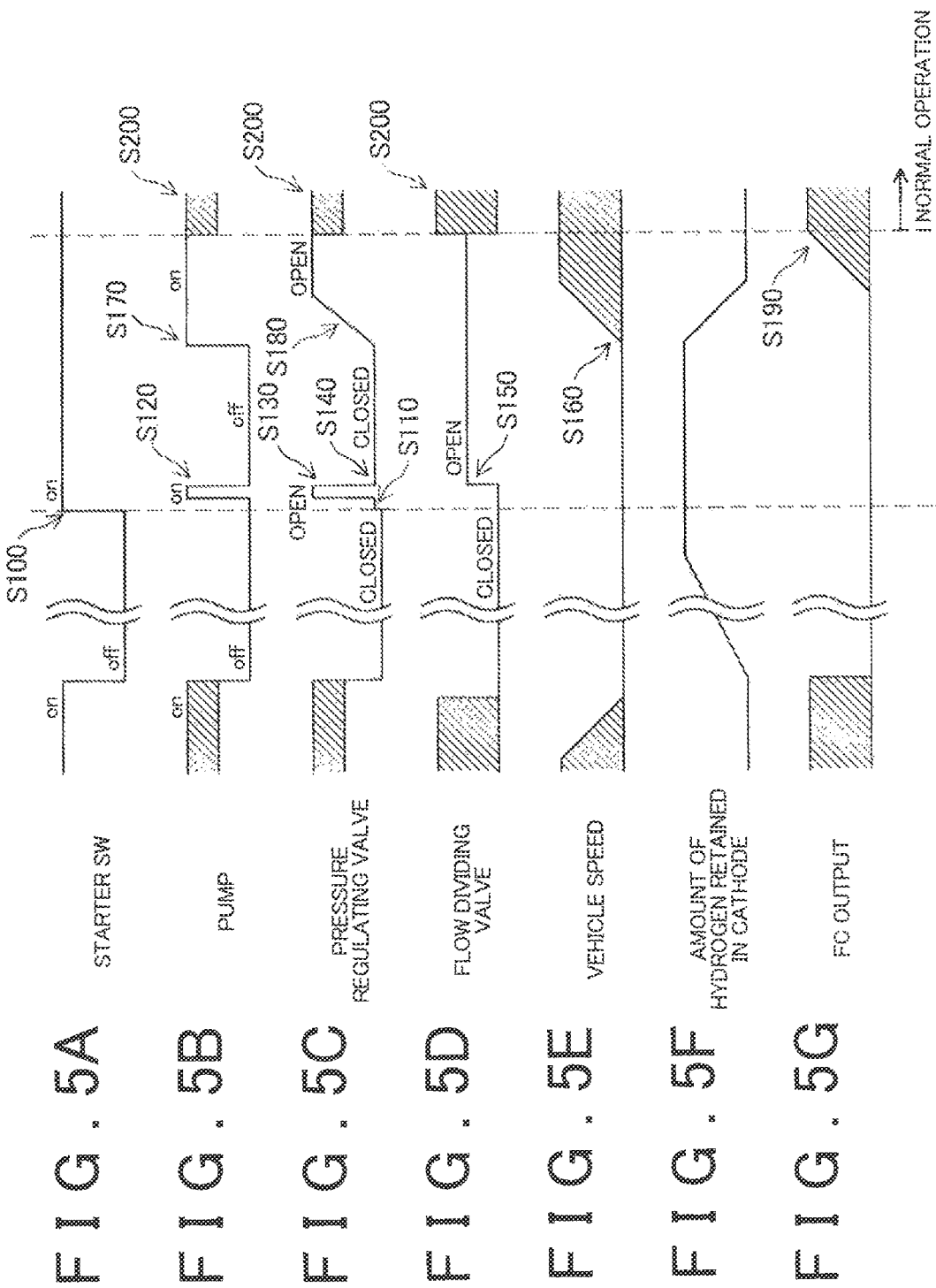

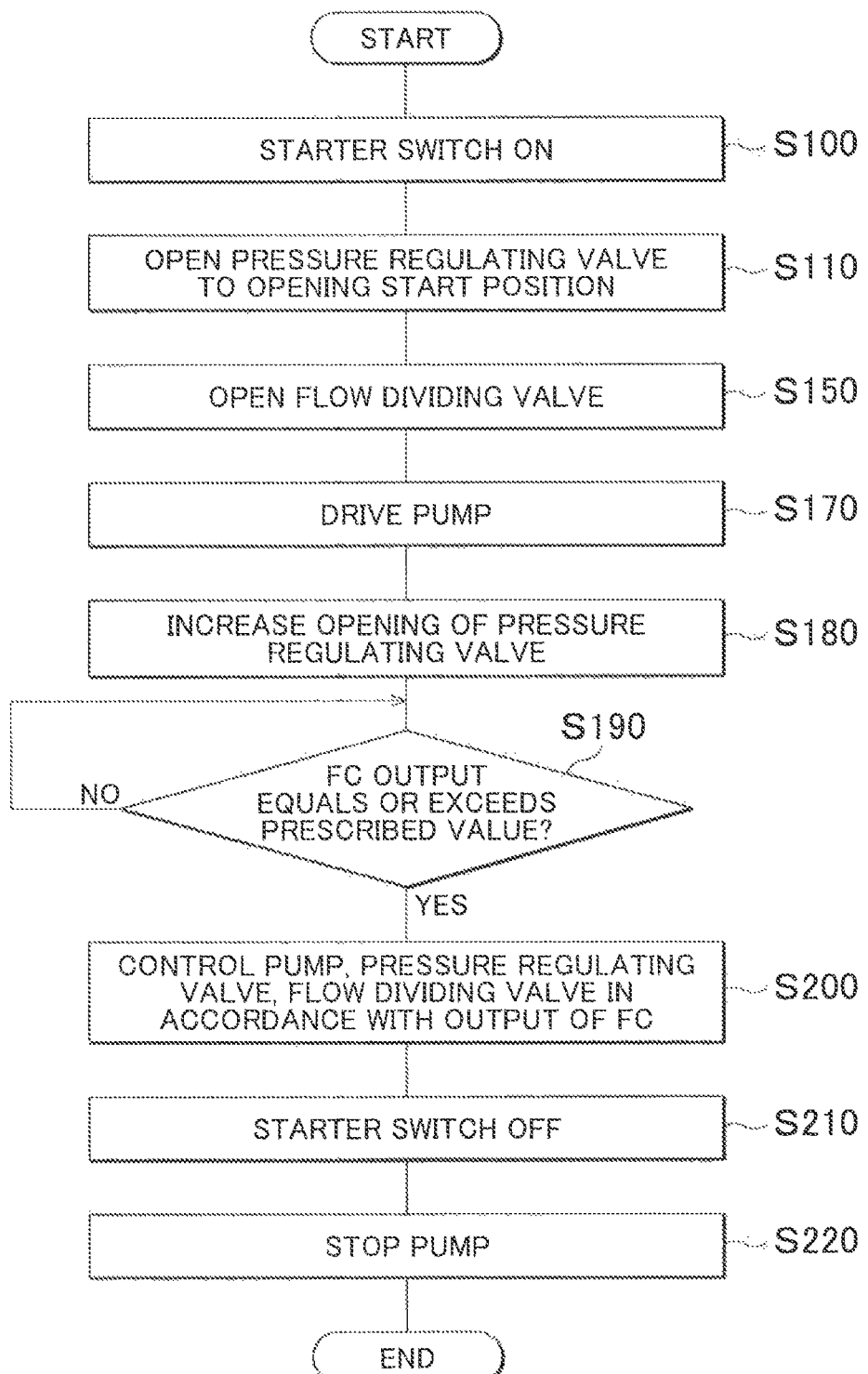

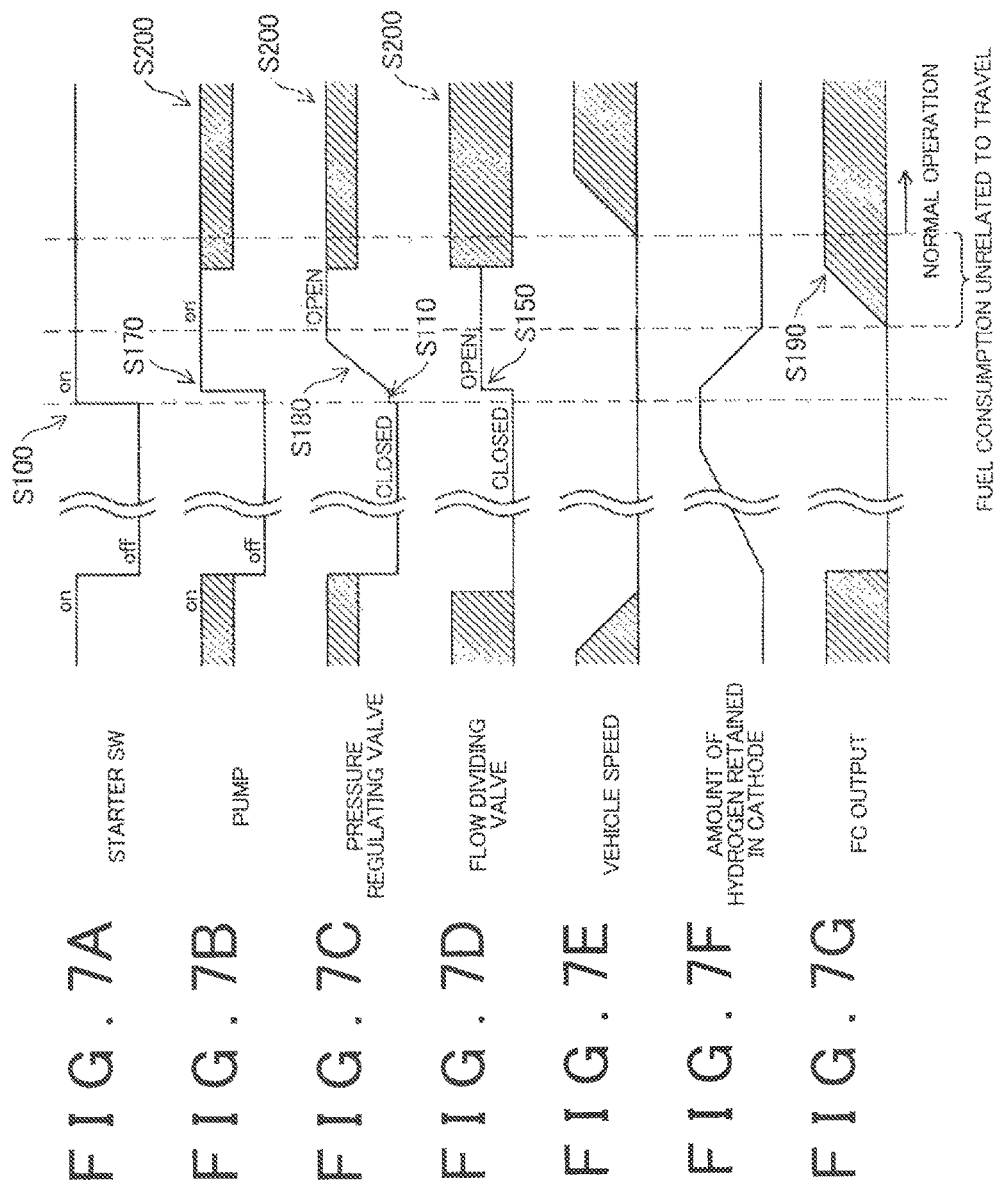

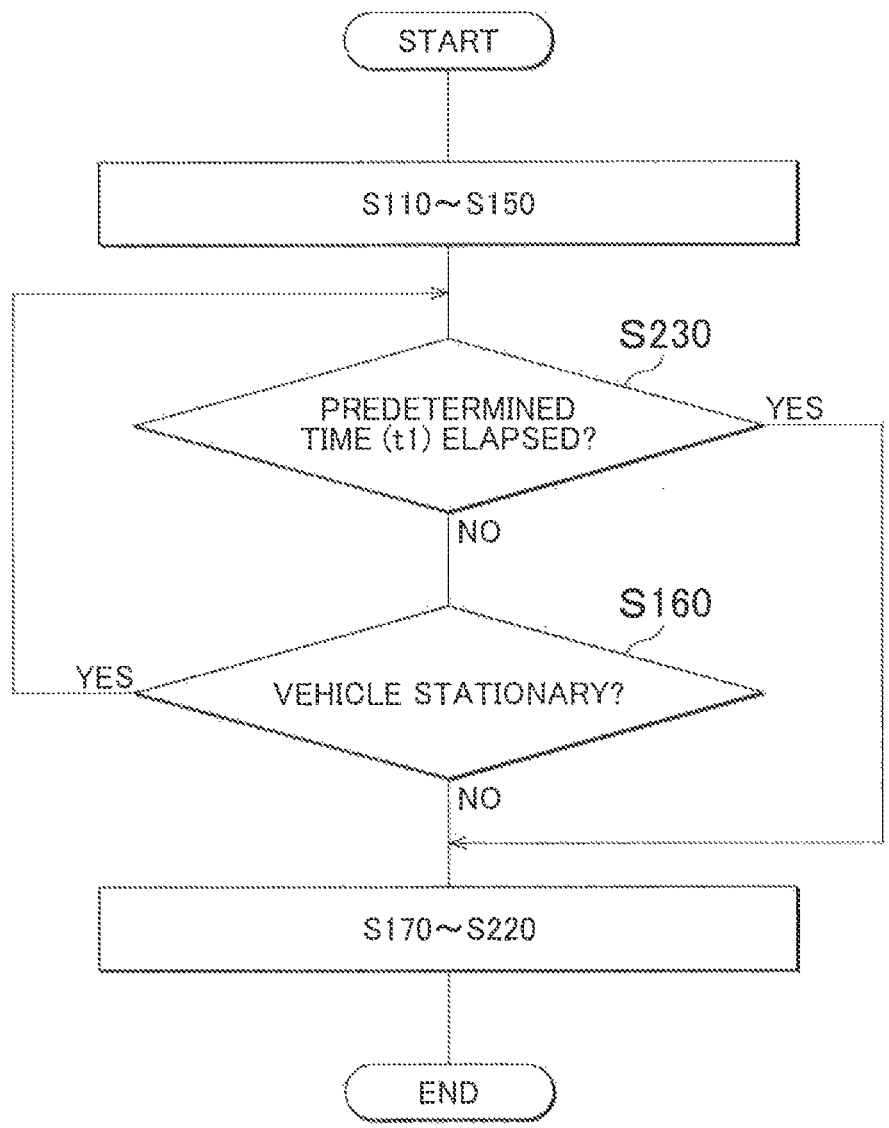

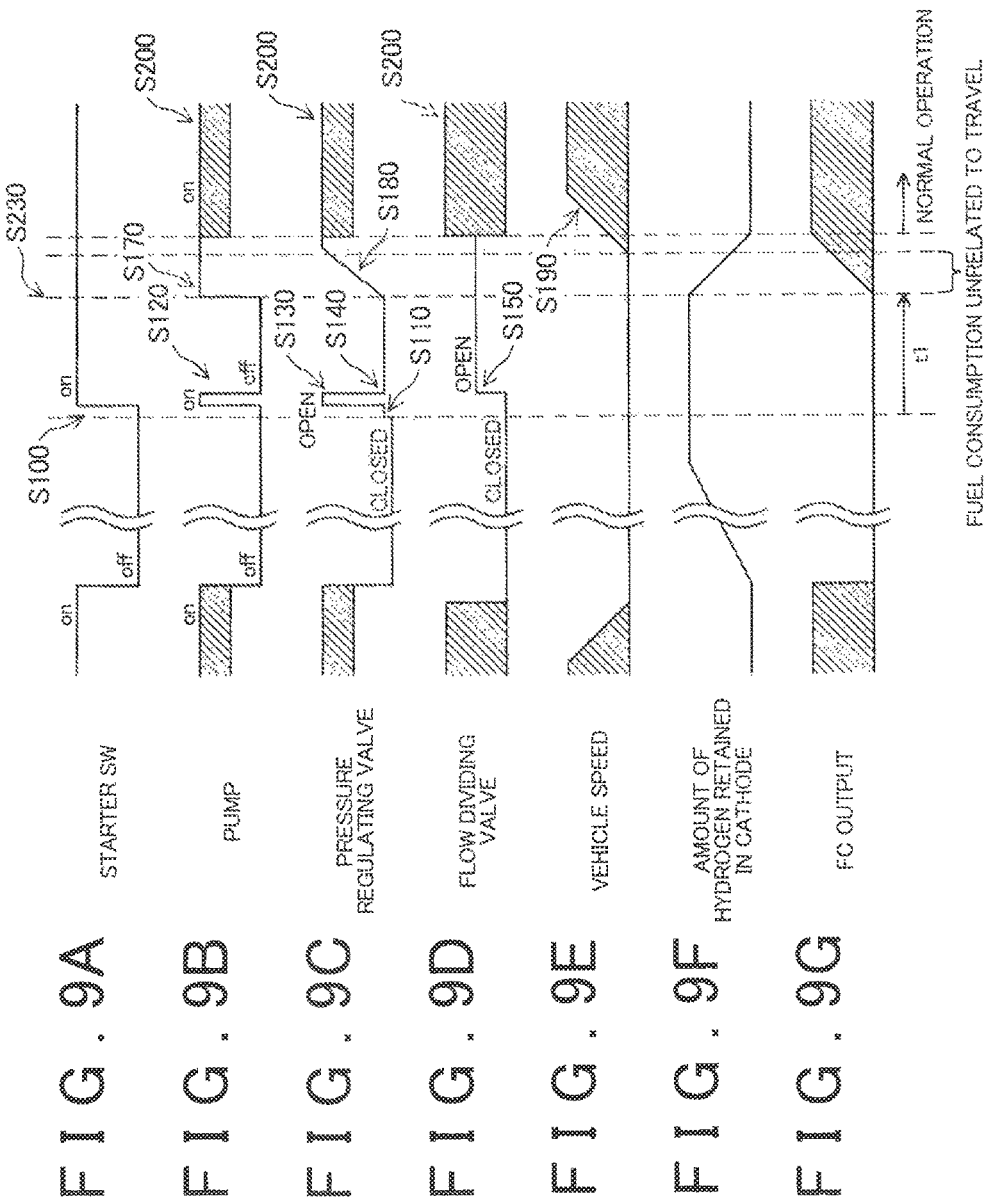

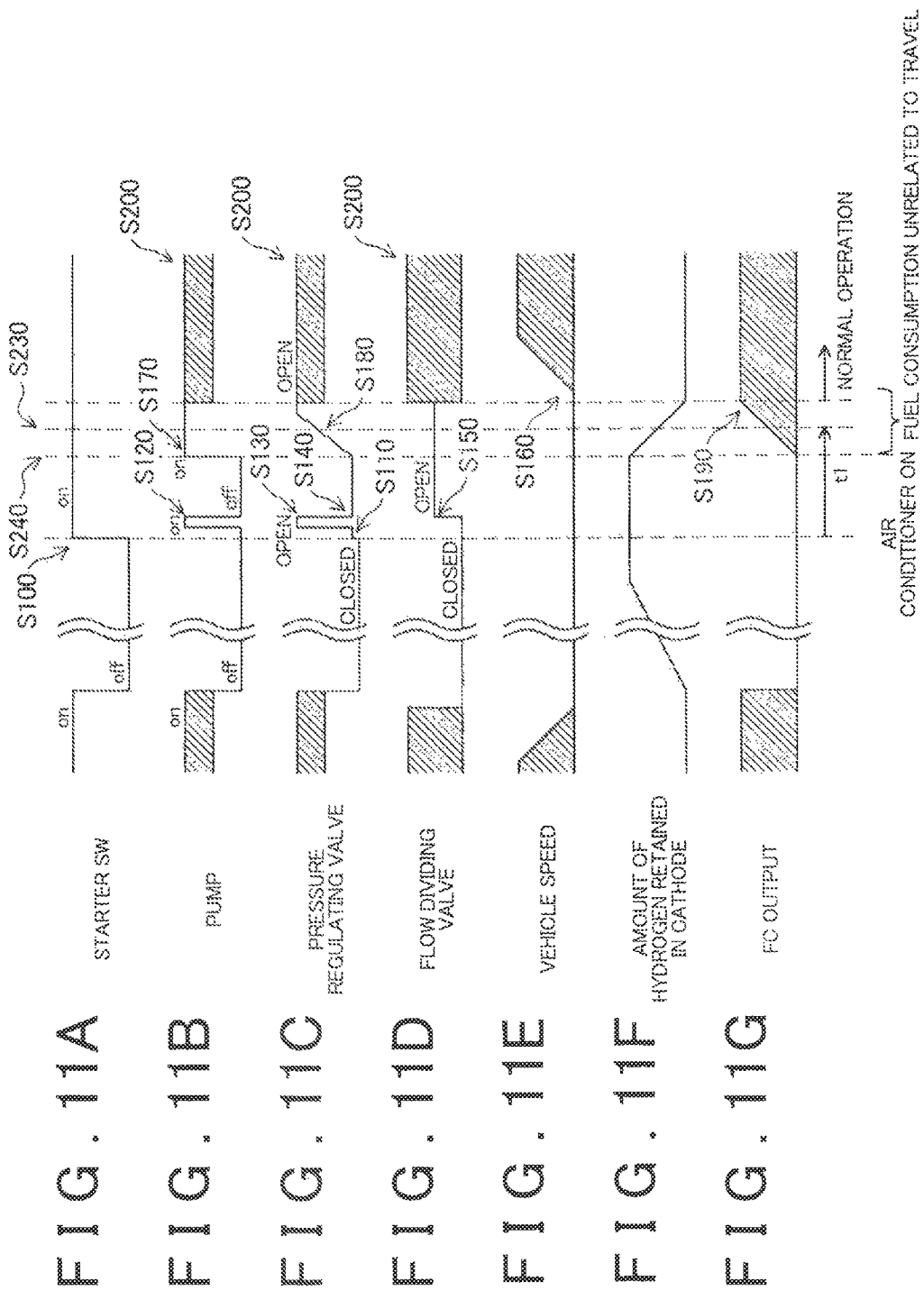

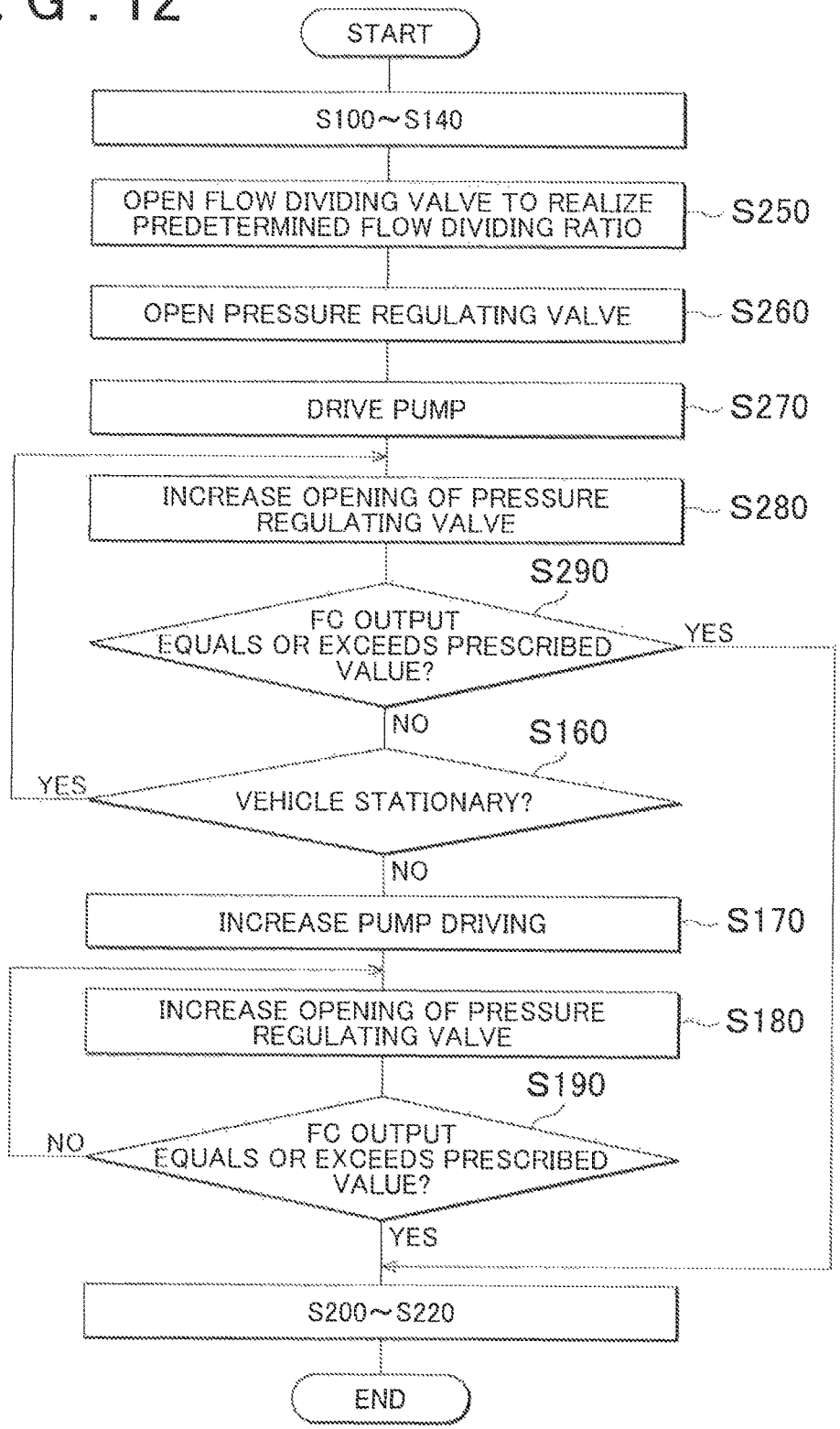

FUEL CELL SYSTEM, FUEL CELL VEHICLE, AND CONTROL METHOD FOR FUEL CELL SYSTEM

INCORPORATION BY REFERENCE

The disclosure of Japanese Patent Application No. 2014-229867, filed on Nov. 12, 2014 including the specification, drawings and abstract is incorporated herein by reference in its entirety.

BACKGROUND OF THE INVENTION

1. Field of the Invention

The invention relates to a fuel cell system used in a fuel cell vehicle, the fuel cell vehicle, and a method of controlling the fuel cell system.

2. Description of Related Art

When a fuel cell is stopped, hydrogen in an anode moves through an electrolyte membrane into a cathode and is retained in the cathode. Japanese Patent Application Publication No. 2008-021485 (JP 2008-021485 A) describes supplying the cathode with an oxidant gas in order to dilute and discharge the hydrogen retained in the cathode. The oxidant gas is supplied by a pump (an air compressor).

However, a fuel cell vehicle does not typically start to run as soon as a starter switch is switched on, and therefore no load demand is issued to the fuel cell. In a condition where no load demand is issued to the fuel cell, it is not preferable, in consideration of fuel efficiency and noise vibration (noise and vibration), to supply the oxidant gas by driving the air compressor merely in order to dilute and discharge the hydrogen retained in the cathode. Moreover, when the oxidant gas is supplied, the fuel cell enters a power generation condition, leading to excessive hydrogen consumption and a corresponding reduction in fuel efficiency.

SUMMARY OF THE INVENTION

The invention provides a fuel cell system, a fuel cell vehicle, and a control method for the fuel cell system with which an improvement in fuel efficiency and a reduction in noticeable noise vibration can be achieved.

A first aspect of the invention relates to a fuel cell system used in a fuel cell vehicle. The fuel cell system includes: a power supply circuit including a fuel cell and a secondary battery; an oxidant gas supply flow passage used to supply an oxidant gas to a cathode of the fuel cell; a pump that compresses the oxidant gas and supplies the compressed oxidant gas to the cathode, the pump being provided in the oxidant gas supply flow passage; and a control unit configured to drive the pump and dilute hydrogen retained in the cathode. The control unit is configured to stop supplying the oxidant gas to the cathode by stopping an operation of the pump such that dilution of the hydrogen retained in the cathode is stopped, while the fuel cell vehicle remains stationary after a starter switch of the fuel cell vehicle is switched from an off state to an on state, or while a load required of the power supply circuit remains smaller than a predetermined value after the starter switch of the fuel cell vehicle is switched from the off state to the on state. According to this configuration, the hydrogen retained in the cathode is not diluted and discharged from the cathode while the fuel cell vehicle remains stationary or the load required of the power supply circuit remains smaller than the predetermined value. Therefore, an amount of fuel consumed for purposes other than travel can be suppressed, enabling an improvement in fuel efficiency. Moreover, wind noise and road noise are generated during travel, making operation noise and vibration generated by the pump less noticeable. When the pump is driven while the fuel cell vehicle is stationary, however, noise vibration in the pump becomes noticeable. According to this configuration, the operation of the pump is stopped as long as the fuel cell vehicle remains stationary, i.e. does not start to travel, following startup of the fuel cell vehicle, and as a result, noise vibration is not noticeable.

The control unit may be configured to supply the oxidant gas to the cathode such that the hydrogen retained in the cathode is diluted and discharged from the cathode, when a predetermined time elapses after the starter switch of the fuel cell vehicle is switched from the off state to the on state, even when the fuel cell vehicle has not yet started to travel. While hydrogen is retained in the cathode, a power generation capacity of the fuel cell remains low. Before the fuel cell generates power, travel is performed using power from the secondary battery. In consideration of the durability of the secondary battery, a state of charge (SOC) of the secondary battery is preferably maintained within a predetermined range. According to this configuration, the oxidant gas is supplied to the cathode in order to dilute the hydrogen retained in the cathode and thereby discharge the hydrogen from the cathode, with the result that the fuel cell becomes capable of generating power, when the predetermined time elapses following startup of the fuel cell vehicle. Hence, the power generation capacity of the fuel cell is high when the predetermined time elapses, and therefore travel can be performed thereafter using power from the fuel cell. As a result, the SOC of the secondary battery can be maintained within the predetermined range.

The control unit may be configured to supply the oxidant gas to the cathode such that the hydrogen retained in the cathode is diluted and discharged from the cathode, when a load demand is issued to the power supply circuit after the starter switch of the fuel cell vehicle is switched from the off state to the on state, even when the fuel cell vehicle has not yet started to travel. In consideration of the durability of the secondary battery, the SOC of the secondary battery is preferably maintained within the predetermined range. According to this configuration, the fuel cell is caused to generate power when a load demand is issued to the power supply circuit, for example when power is required to activate an air conditioner, even before the fuel cell vehicle starts to travel, and therefore the SOC of the secondary battery can be maintained within the predetermined range.

A second aspect of the invention relates to a fuel cell vehicle including the fuel cell system according to the first aspect.

A third aspect of the invention relates to a control method for a fuel cell system used in a fuel cell vehicle. The fuel cell system includes: a power supply circuit including a fuel cell and a secondary battery; an oxidant gas supply flow passage used to supply an oxidant gas to a cathode of the fuel cell; a pump that compresses the oxidant gas and supplies the compressed oxidant gas to the cathode, the pump being provided in the oxidant gas supply flow passage; and a control unit configured to drive the pump and dilute hydrogen retained in the cathode. The control method includes stopping supplying the oxidant gas to the cathode by stopping an operation of the pump such that dilution of the hydrogen retained in the cathode is stopped, while the fuel cell vehicle remains stationary after a starter switch of the fuel cell vehicle is switched from an off state to an on state, or while a load required of the power supply circuit remains smaller than a predetermined value after the starter switch of the fuel cell vehicle is switched from the off state to the on state.

According to this configuration, similarly to the first aspect, an improvement in fuel efficiency and a reduction in noticeable noise vibration can be achieved.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIGS. 5A to 5G are timing charts according to the first embodiment;

FIG. 6 is a flowchart showing control for discharging hydrogen from the cathode according to a comparative example;

FIGS. 7A to 7G are timing charts according to the comparative example;

FIG. 8 is a flowchart showing control for discharging hydrogen from the cathode according to a second embodiment;

FIGS. 9A to 9G are timing charts according to the second embodiment;

FIGS. 11A to 11G are timing charts according to the third embodiment;

FIG. 12 is a flowchart showing control for discharging hydrogen from the cathode according to a fourth embodiment; and FIGS. 13A to 13G are timing charts according to the fourth embodiment.

DETAILED DESCRIPTION OF EMBODIMENTS

Figure 1:
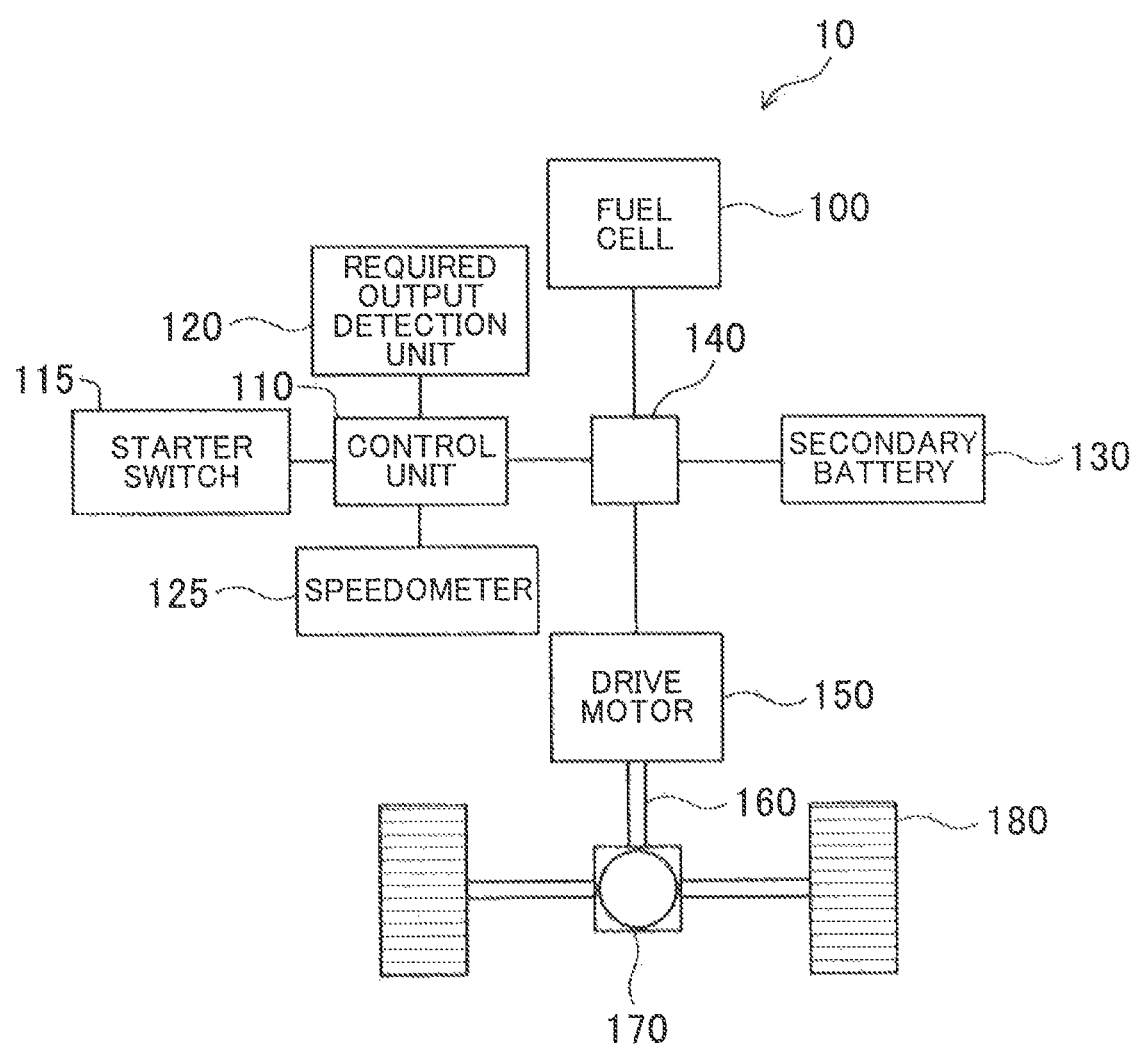
FIG. 1 is an illustrative view showing a vehicle installed with a fuel cell.

First, a first embodiment will be described. FIG. 1 is an illustrative view showing a vehicle installed with a fuel cell. A fuel cell vehicle 10 includes a fuel cell 100, a control unit 110 (also referred to as an electronic control unit (ECU)), a starter switch 115, a required output detection unit 120, a speedometer 125, a secondary battery 130, a power split controller 140, a drive motor 150, a drive shaft 160, a power split gear 170, and vehicle wheels 180.

The fuel cell 100 is a power generation apparatus for extracting power by inducing an electrochemical reaction between a fuel gas and an oxidant gas. The control unit 110 controls operations of the fuel cell 100 and the secondary battery 130 on the basis of a required output value obtained from the required output detection unit 120. The required output detection unit 120 detects a depression amount of an accelerator (not shown) of the fuel cell vehicle 10, and from the magnitude of the depression amount detects a required output from a driver. The control unit 110 calculates a required power amount required of the fuel cell 100 from the required output. The starter switch 115 is a main switch used to start and stop the fuel cell vehicle 10. The speedometer 125 measures a travel speed of the fuel cell vehicle 10. The speedometer 125 obtains the travel speed of the fuel cell vehicle 10 by measuring one of a rotation speed of the drive motor 150, a rotation speed of the drive shaft 160, a rotation speed of the power split gear 170, and a rotation speed of the vehicle wheels 180. The secondary battery 130 is used as a power supply for moving the fuel cell vehicle 10 when an amount of power generated by the fuel cell 100 is small, such as immediately after the fuel cell vehicle 10 is started. A nickel hydrogen battery or a lithium ion battery, for example, may be employed as the secondary battery 130. The secondary battery 130 may be charged either directly using power output from the fuel cell 100, or by regenerating kinetic energy generated by the fuel cell vehicle 10 while decelerating using the drive motor 150, for example. The power split controller 140 controls an amount of power fed to the drive motor 150 from the fuel cell 100 and an amount of power fed to the drive motor 150 from the secondary battery 130 in response to a command from the control unit 110. Further, when the fuel cell vehicle 10 decelerates, the power split controller 140 feeds power regenerated by the drive motor 150 to the secondary battery 130 in response to a command from the control unit 110. The power split controller 140, the fuel cell 100, and the secondary battery 130 together constitute a power supply circuit. The drive motor 150 functions as a motor used to move the fuel cell vehicle 10. Further, when the fuel cell vehicle 10 decelerates, the drive motor 150 functions as a power generator used to regenerate the kinetic energy of the fuel cell vehicle 10 as electric energy. The drive shaft 160 is a rotary shaft for transmitting driving force generated by the drive motor 150 to the power split gear 170. The power split gear 170 distributes the driving force between the left and right vehicle wheels 180.

Figure 2:
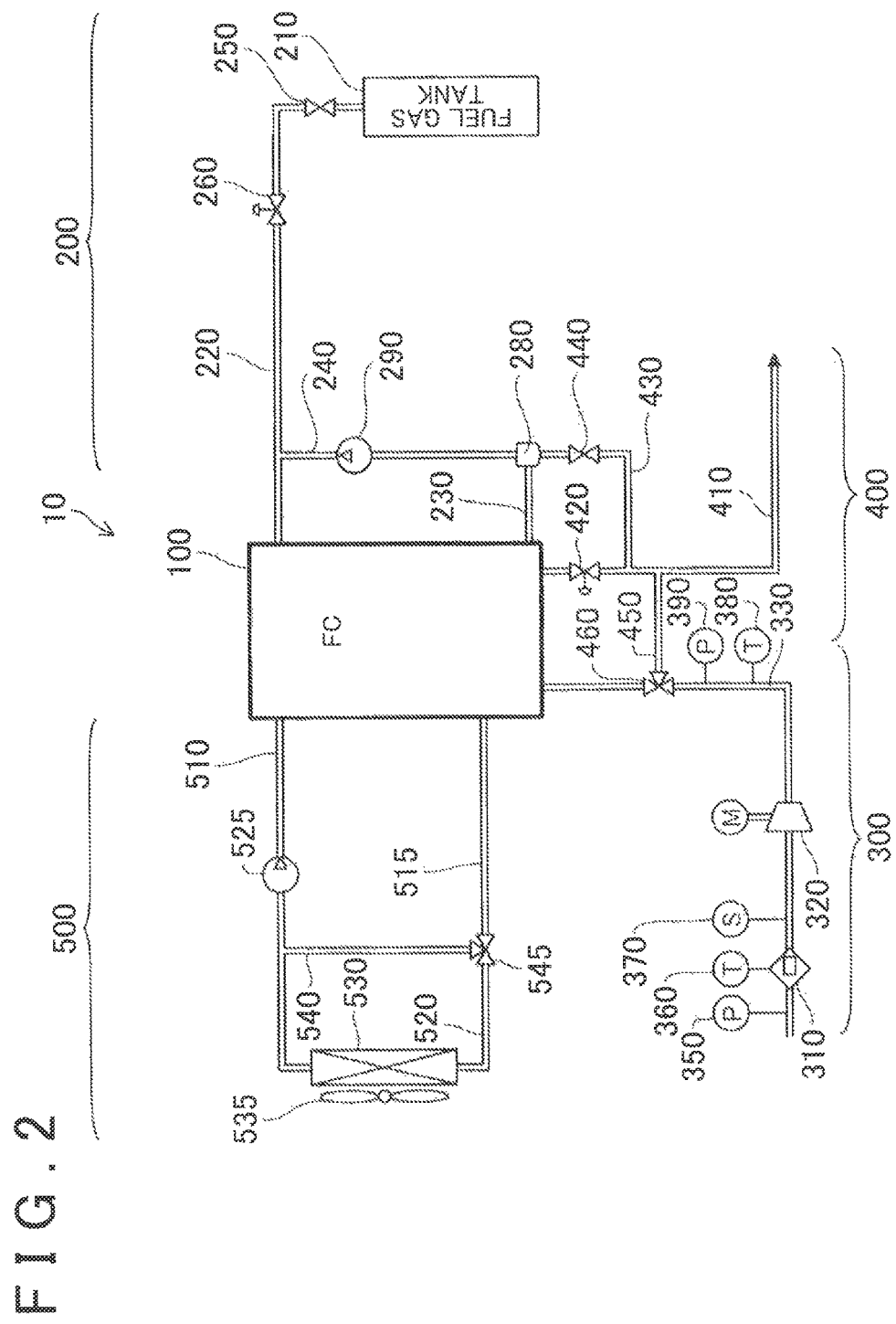
FIG. 2 is an illustrative view showing a fuel cell system of the fuel cell vehicle.

FIG. 2 is an illustrative view showing a fuel cell system of the fuel cell vehicle 10. The fuel cell vehicle 10 includes the fuel cell 100, a fuel gas supply circuit 200, an oxidant gas supply circuit 300, an off-gas circuit 400, and a cooling circuit 500.

The fuel gas supply circuit 200 includes a fuel gas tank 210, a fuel gas supply pipe 220, a fuel gas exhaust pipe 230, a fuel gas recirculation pipe 240, a main stop valve 250, a regulator 260, a gas-liquid separator 280, and a hydrogen pump 290. The fuel gas tank 210 stores a fuel gas. In this embodiment, hydrogen is used as the fuel gas. The fuel gas tank 210 is connected to the fuel cell 100 by the fuel gas supply pipe 220. The main stop valve 250 and the regulator 260 are provided in the fuel gas supply pipe 220 in that order from the fuel gas tank 210 side. The main stop valve 250 switches a supply of fuel gas from the fuel gas tank 210 between an on state and an off state. The regulator 260 adjusts a pressure of the fuel gas supplied to the fuel cell 100.

The fuel gas exhaust pipe 230 discharges fuel off-gas from the fuel cell 100. The fuel gas recirculation pipe 240 is connected to the fuel gas exhaust pipe 230 and the fuel gas supply pipe 220. The gas-liquid separator 280 is provided between the fuel gas exhaust pipe 230 and the fuel gas recirculation pipe 240. The fuel off-gas contains unconsumed hydrogen, nitrogen that has passed through the fuel cell 100, and water. The gas-liquid separator 280 separates the water contained in the fuel off-gas from the gases (hydrogen and nitrogen) contained therein. Further, the hydrogen pump 290 is provided in the fuel gas recirculation pipe 240. In the fuel cell system, the fuel off-gas is supplied to the fuel cell 100 using the fuel gas recirculation pipe 240 and the hydrogen pump 290, whereupon the hydrogen in the fuel off-gas is used to generate power.

The oxidant gas supply circuit 300 includes an air cleaner 310, an air compressor 320 (also referred to as a "pump 320"), an oxidant gas supply pipe 330 (also referred to as an "oxidant gas supply flow passage 330"), an atmospheric pressure sensor 350, an outside air temperature sensor 360, an air flow meter 370, a supplied gas temperature sensor 380, and a supplied gas pressure sensor 390. In the fuel cell 100 according to this embodiment, air (oxygen in air) is used as the oxidant gas. The air cleaner 310 removes dust and dirt from the air when the air is taken in. The pump 320 compresses the air and feeds the air to the fuel cell 100 through the oxidant gas supply pipe 330. The oxidant gas supply pipe 330 connects the pump 320 to the fuel cell 100 (a cathode to be described below). The atmospheric pressure sensor 350 measures the atmospheric pressure. The outside air temperature sensor 360 obtains a temperature of the air before being taken in. The air flow meter 370 measures a flow rate of the intake air. The flow rate is substantially identical to the amount of air supplied to the fuel cell 100. Note that the flow rate of the air varies according to a rotation speed of the pump 320. The supplied gas temperature sensor 380 measures the temperature of the air supplied to the fuel cell 100, while the supplied gas pressure sensor 390 measures the pressure of the air supplied to the fuel cell 100.

The off-gas circuit 400 includes an off-gas pipe 410, a pressure regulating valve 420, a fuel gas exhaust pipe 430, an exhaust drain valve 440, an oxidant gas bypass pipe 450, and a flow dividing valve 460. The off-gas pipe 410 discharges oxidant off-gas from the fuel cell 100. The pressure regulating valve 420 is provided in the off-gas pipe 410. The pressure regulating valve 420 regulates the pressure of the air in the fuel cell 100. The fuel gas exhaust pipe 430 connects the gas-liquid separator 280 to the off-gas pipe 410. The exhaust drain valve 440 is provided in the fuel gas exhaust pipe 430. The control unit 110 (FIG. 1) opens the exhaust drain valve 440 in order to discharge water and gas (mainly nitrogen) when a nitrogen concentration of the fuel off-gas increases or an amount of water in the gas-liquid separator 280 increases. Hydrogen is also discharged at this time. In this embodiment, the fuel gas exhaust pipe 430 is connected to the off-gas pipe 410 such that the hydrogen in the discharged gas is diluted by the oxidant off-gas. The oxidant gas bypass pipe 450 connects the oxidant gas supply pipe 330 to the off-gas pipe 410. The flow dividing valve 460 is provided in a connecting portion between the oxidant gas bypass pipe 450 and the oxidant gas supply pipe 330. When the control unit 110 (FIG. 1) opens the exhaust drain valve 440 in order to discharge water and gas (mainly nitrogen), the control unit 110 also opens the flow dividing valve 460 such that air flows into the oxidant gas bypass pipe 450 and dilutes the hydrogen therein. Further, as will be described below, when hydrogen in the cathode of the fuel cell 100 is discharged during startup of the fuel cell vehicle 10, the control unit 110 opens the flow dividing valve 460 such that air flows into the oxidant gas bypass pipe 450 and dilutes the hydrogen therein. The off gas pipe 410 serves as both an oxidant gas discharge now passage and a fuel as discharge flow passage.

The cooling circuit 500 includes a cooling water supply pipe 510, a cooling water exhaust pipe 515, a radiator pipe 520, a water pump 525, a radiator 530, a bypass pipe 540, and a three-way valve 545. The cooling water supply pipe 510 is a pipe for supplying cooling water to the fuel cell 100, and the water pump 525 is disposed in the cooling water supply pipe 510. The cooling water exhaust pipe 515 is a pipe for discharging the cooling water from the fuel cell 100. A downstream portion of the cooling water exhaust pipe 515 is connected to the radiator pipe 520 and the bypass pipe 540 via the three-way valve 545. The radiator 530 is provided in the radiator pipe 520. A radiator fan 535 is provided in the radiator 530. The radiator fan 535 feeds air to the radiator 530, thereby promoting heat radiation from the radiator 530. A downstream portion of the radiator pipe 520 and a downstream portion of the bypass pipe 540 are connected to the cooling water supply pipe 510.

The cooling water is supplied to the fuel cell 100 through the cooling water supply pipe 510 by the water pump 525 in order to cool the fuel cell 100. The cooling water is warmed by heat recovered from the fuel cell 100, and is then discharged through the cooling water exhaust pipe 515. The warmed cooling water is distributed between the radiator pipe 520 and the bypass pipe 540 by the three-way valve 545. The cooling water that flows to the radiator pipe 520 is cooled by the radiator 530, but the cooling water that flows to the bypass pipe 540 is not cooled. A temperature of the cooling water in the cooling circuit 500 is controlled in accordance with a ratio at which the cooling water is distributed to the radiator pipe 520 and the bypass pipe 540 by the three-way valve 545, the outside air temperature, and an air flow from the radiator fan 535.

Figure 3A:
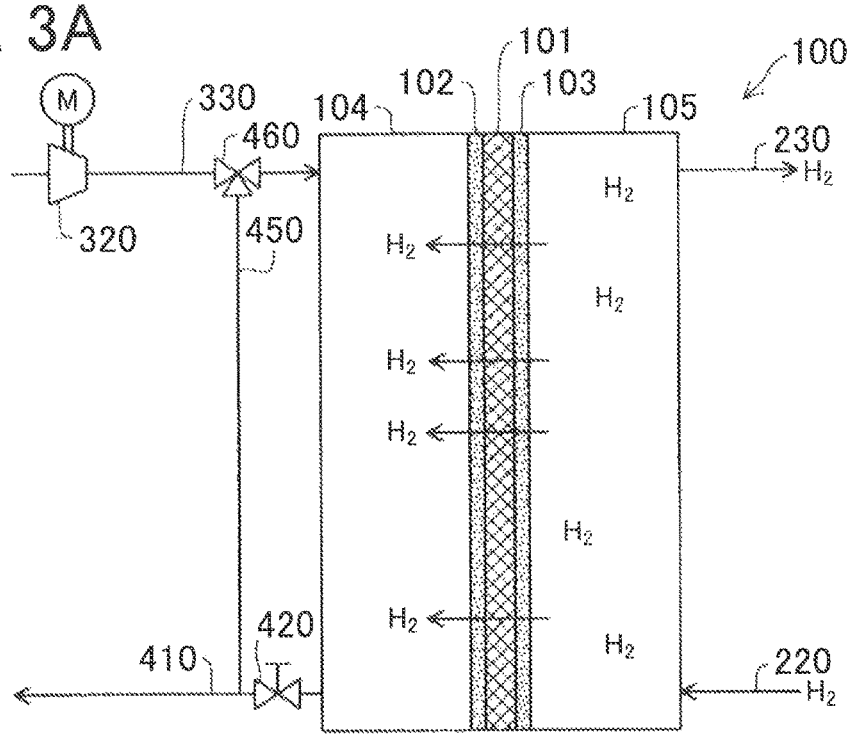
FIGS. 3A and 3B are schematic illustrative views showing the fuel cell.
Figure 3B:
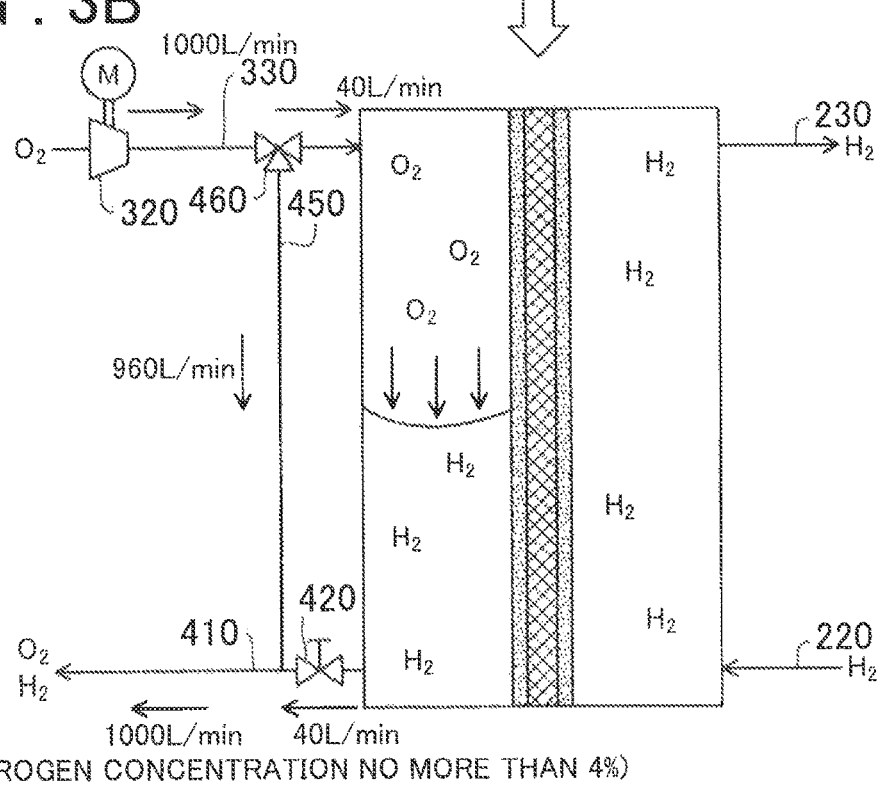

FIGS. 3A and 3B are schematic illustrative views showing the fuel cell. The fuel cell 100 includes an electrolyte membrane 101, a cathode side catalyst layer 102, an anode side catalyst layer 103, a cathode side gas flow passage 104, and an anode side gas flow passage 105. The cathode side catalyst layer 102 and the cathode side gas flow passage 104 will be referred to collectively as a cathode, while the anode side catalyst layer 103 and the anode side gas flow passage 105 will be referred to collectively as an anode. The electrolyte membrane is a proton-conductive electrolyte membrane formed using a fluorine-based electrolyte membrane resin (an ion exchange resin) such as a perfluorocarbon sulfonic acid polymer, for example. The cathode side catalyst layer 102 and the anode side catalyst layer 103 contain carbon supporting a catalyst (platinum, for example). The cathode side gas flow passage 104 is a flow passage for supplying air to the cathode side catalyst layer 102, and includes a gas diffusion layer formed from carbon paper and a porous member such as expanded metal. The anode side gas flow passage 105 is a flow passage for supplying air to the anode side catalyst layer 103, and includes a gas diffusion layer formed from carbon paper and a serpentine flow passage formed from a separator (not shown).

FIG. 3A is an illustrative view illustrating a reason why hydrogen is retained in the cathode. When the starter switch 115 of the fuel cell vehicle 10 is switched off such that the fuel cell vehicle 10 and the fuel cell system thereof are stopped, the main stop valve 250 and the regulator 260 of the fuel gas supply circuit 200 (FIG. 2) are closed, and the hydrogen pump 290 is likewise stopped. As a result, hydrogen is no longer supplied to the anode of the fuel cell 100. Hydrogen remains in the anode, however, and since hydrogen diffuses easily, the hydrogen passes through the electrolyte membrane 101 and diffuses to the cathode side. When a state of equilibrium is achieved between respective partial pressures of the hydrogen in the cathode and the anode, the respective partial pressures of the hydrogen in the cathode and the anode remain constant. When hydrogen remains in the cathode, a power generation capacity of the fuel cell 100 decreases, and therefore the hydrogen is preferably discharged.

FIG. 3B is an illustrative view illustrating discharge of the hydrogen in the cathode. The control unit 110 adjusts an opening of the flow dividing valve 460 such that a small amount of air (4%, for example) flows to the fuel cell 100 and a large amount of air (96%, for example) flows to the oxidant gas bypass pipe 450. The control unit 110 then drives the pump 320 and gradually opens the pressure regulating valve 420 such that air is supplied to the cathode of the fuel cell 100. In this embodiment, the pump 320 pumps air at a flow rate of 1000 L/min, for example, of which 4% (40 L/min) flows to the fuel cell 100 and 96% (960 L/min) flows to the oxidant gas bypass pipe 450. The flow rate is set at 1000 L/min in consideration of noise vibration (noise and vibration) in the pump 320. This flow rate, which is employed when the fuel cell vehicle 10 is stopped, is set appropriately, in consideration of noise vibration, at a smaller value than the flow rate of the air supplied to the fuel cell 100 when a normal operation is underway in the fuel cell vehicle 10. The hydrogen in the cathode is purged from the cathode and thus discharged from the fuel cell 100. The hydrogen discharged at this time is diluted by the air flowing through the oxidant gas bypass pipe 450 and released into the atmosphere. The hydrogen concentration of the released gas is preferably no higher than 4%.

Figure 4A:
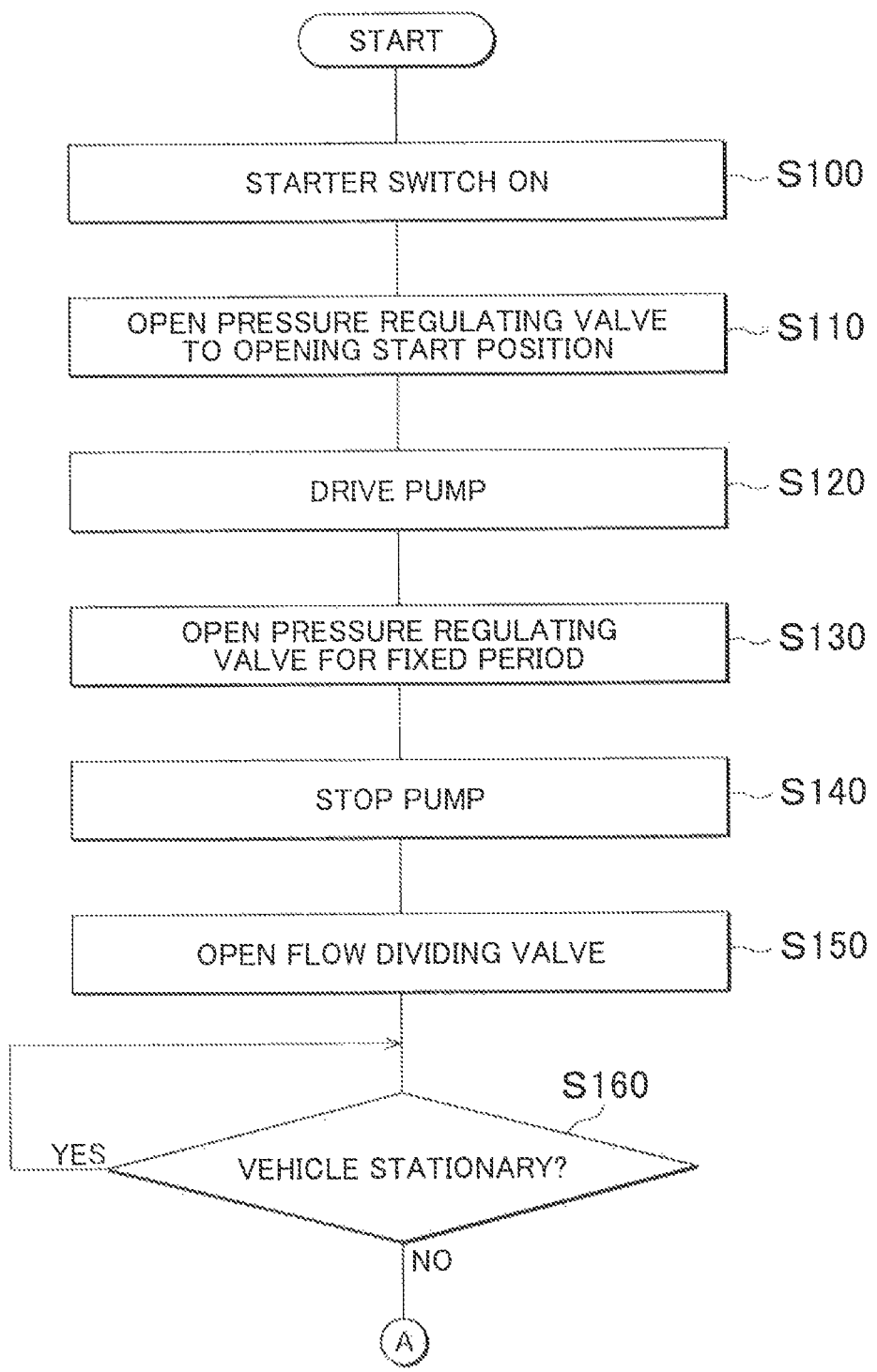
FIGS. 4A and 4B are flowcharts showing control for discharging hydrogen from a cathode according to a first embodiment.
Figure 4B:
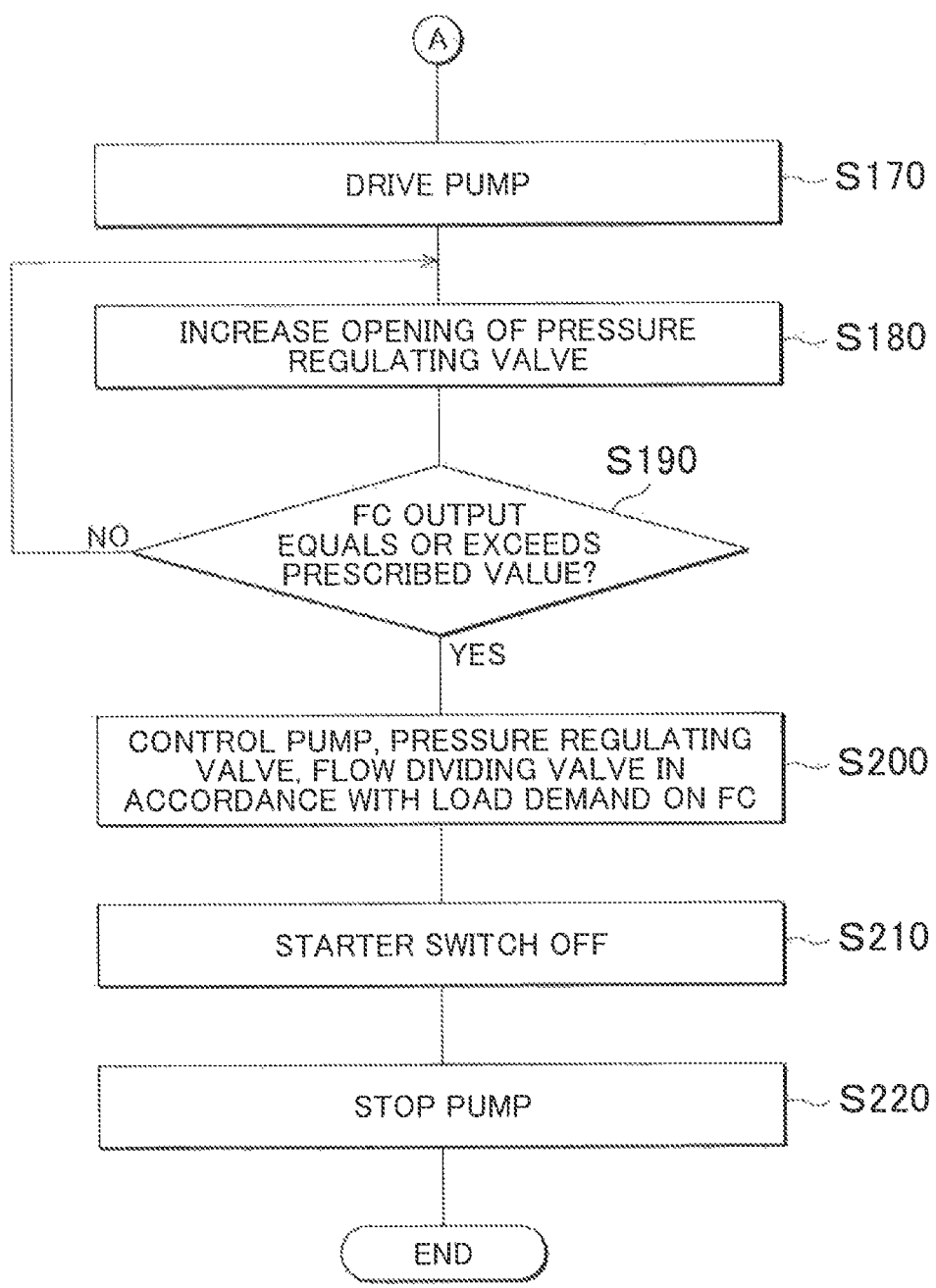

FIGS. 4A and 4B are flowcharts showing control for discharging hydrogen from the cathode according to a first embodiment. FIGS. 5A to 5G are timing charts according to the first embodiment. In FIGS. 5A to 5G, shaded parts indicate locations where various values may be obtained, depending on operating conditions of the fuel cell vehicle 10. As shown in FIG. 5F, the hydrogen retained in the cathode increases gradually after the starter switch 115 is switched off until a state of equilibrium is reached. In step S100, the starter switch 115 of the fuel cell vehicle 10 is switched on. In step S110, the control unit 110 opens the pressure regulating valve 420 to an opening start position. The pressure regulating valve 420 is opened to the opening start position in order to obtain a starting point from which the control unit 110 determines the opening of the pressure regulating valve 420.

The control unit 110 then drives the pump 320 in step S120, and opens the pressure regulating valve 420 for a fixed period in step S130. These two processes are implemented to turn negative pressure in the cathode of the fuel cell 100 into positive pressure. In step S140, the control unit 110 closes the pressure regulating valve 420 and stops the air compressor. The pressure regulating valve 420 may be set in the opening start position. In step S150, the control unit 110 adjusts the opening of the flow dividing valve 460 so that when air is supplied by the air compressor in a subsequent process, a small amount of air (4%, for example) flows to the fuel cell 100 and a large amount of air (96%, for example) flows to the oxidant gas bypass pipe 450. The control unit 110 then waits in this condition for the fuel cell vehicle 10 to start traveling.

In step S160, the control unit 110 determines from the value of the speedometer 125 whether or not the fuel cell vehicle is stationary (i.e. not traveling). When the fuel cell vehicle 10 is stationary, the control unit 110 continues to wait. When the fuel cell vehicle 10 is not stationary, the control unit 110 advances the processing to step S170. Power required for travel at this time is supplied by the secondary battery 130, for example. Note that when the fuel cell vehicle 10 travels at a very low speed (a speed no higher than 5 km/h, for example) rather than being completely stationary (a speed of 0 km/h), the control unit 110 may determine that the fuel cell vehicle 10 is stationary in the determination of step S160.

Once the fuel cell vehicle starts to travel, the control unit 110 drives the pump 320 in step S170. In consideration of noise vibration, the rotation speed of the pump 320 at this time is preferably set to be lower than the rotation speed of the air compressor during a normal operation. In step S180, the control unit 110 gradually opens the pressure regulating valve 420. Accordingly, as shown in FIG. 5, the hydrogen in the cathode of the fuel cell 100 is discharged so as to gradually decrease, whereby the output (an output voltage) of the fuel cell 100 gradually increases.

In step S190, the control unit 110 determines whether or not the output of the fuel cell 100 has reached or exceeded a predetermined value. In this embodiment, the control unit 110 determines whether or not a voltage per cell equals or exceeds 0.6 V. When hydrogen remains in the cathode, an electromotive force of the fuel cell 100 is low, but as the amount of hydrogen in the cathode decreases, the electromotive force gradually increases. When the voltage per cell equals or exceeds 0.6 V, it may be determined that substantially all of the hydrogen in the cathode has been discharged. When the voltage per cell equals or exceeds 0.6 V, the control unit 110 advances the processing to step S200. In step S200, the control unit 110 controls the respective openings of the pump 320, the pressure regulating valve 420, and the flow dividing valve 460 in accordance with a load required of the fuel cell 100. When the starter switch 115 is switched off in step S210, the control unit 110 advances the processing to step S220, where the pump 320 is stopped.

FIG. 6 is a flowchart showing control for discharging hydrogen from the cathode according to a comparative example. The comparative example differs from the first embodiment in that the processing of steps S130, S140, and S160 is not executed. More specifically, in the first embodiment, the hydrogen in the cathode of the fuel cell 100 is not discharged until the fuel cell vehicle 10 starts to travel, whereas in the comparative example, the processing for discharging hydrogen from the cathode of the fuel cell 100 is executed when the starter switch 115 is switched on in step S100, without determining whether or not the fuel cell vehicle 10 is stationary.

FIGS. 7A to 7G are timing charts according to the comparative example. In the first embodiment shown in FIGS. 5A to 5G, the fuel cell 100 reaches a voltage at which a normal operation is possible after the fuel cell vehicle 10 starts to travel, whereas in the comparative example shown in FIGS. 7A to 7G, the fuel cell 100 reaches the voltage at which a normal operation is possible before the fuel cell vehicle 10 starts to travel. Once the fuel cell 100 reaches the voltage at which a normal operation is possible, fuel is consumed. In the comparative example, therefore, fuel consumption begins earlier than in the first embodiment. As a result, the fuel efficiency deteriorates due to the fuel consumed before the fuel cell vehicle 10 starts to travel.

According to the first embodiment, described above, the fuel cell 100 starts to consume fuel after the fuel cell vehicle 10 starts to travel, and therefore an improvement in fuel efficiency can be achieved in comparison with the comparative example. Further, when the fuel cell vehicle 10 travels, wind noise, road noise, and vibration are generated. Wind noise and road noise are both loud, and therefore, when the pump 320 is driven after the fuel cell vehicle 10 starts to travel, noise vibration accompanying driving of the pump 320 becomes less noticeable due to the wind noise and road noise.

Next, a second embodiment will be described. FIG. 8 is a flowchart showing control for discharging hydrogen from the cathode according to the second embodiment. The second embodiment differs from the first embodiment in that step S230 is inserted before step S160. In step S230, the control unit 110 determines whether or not a predetermined time (a predetermined time (t1)) has elapsed after switching the starter switch 115 on. In the second embodiment, the predetermined time (t1) is set at one minute. When the predetermined time (t1) has elapsed after switching the starter switch 115 on, the control unit 110 advances the processing to step S170 regardless of whether or not the fuel cell vehicle 10 is stationary (step S160).

FIGS. 9A to 9G are timing charts according to the second embodiment. In the first embodiment shown in FIGS. 5A to 5G, the pump 320 is driven and the pressure regulating valve 420 is opened, whereby the amount of hydrogen retained in the cathode of the fuel cell 100 starts to decrease and the output of the fuel cell 100 starts to increase, at a point where the speed of the fuel cell vehicle 10 starts to increase. In the second embodiment, the pump 320 is driven and the pressure regulating valve 420 is opened, whereby the amount of hydrogen retained in the cathode of the fuel cell 100 starts to decrease and the output of the fuel cell 100 starts to increase, at a point were the predetermined time (the predetermined time (t1)) elapses after switching the starter switch 115 on. Note that when the fuel cell vehicle 10 starts to travel before the predetermined time (t1) elapses, the processing described in the first embodiment is performed. With the second embodiment, as is evident from FIGS. 9A to 9G, the fuel efficiency can be improved in comparison with the comparative example. Note that in the second embodiment, the predetermined time (t1) is set at one minute, but the time from the point at which the starter switch 115 is switched on to the point at which the fuel cell vehicle 10 starts to travel differs from driver to driver. Hence, the control unit 110 may modify the predetermined time (t1) on the basis of an operation history of the fuel cell vehicle 10, or more specifically past times from the point at which the starter switch 115 is switched on to the point at which the fuel cell vehicle 10 starts to travel. For example, the predetermined time (t1) may be set at 80% of an average past time. Alternatively, the predetermined time (t1) may be set at (average past time—20 seconds). When, in this case, the time from the point at which the starter switch 115 is switched on to the point at which the fuel cell vehicle 10 starts to travel is too long, for example more than five minutes, the control unit 110 may calculate an average value with substituting five minute for the time longer than five minutes.

According to the second embodiment described above, the hydrogen in the cathode of the fuel cell 100 is discharged once the predetermined time (t1) elapses, even when the fuel cell vehicle 10 has not yet started to travel, whereby the fuel cell 100 becomes capable of generating power. Before the fuel cell 100 generates power, the fuel cell vehicle 10 travels using power from the secondary battery 130. In consideration of the durability of the secondary battery, a SOC of the secondary battery 130 is preferably maintained within a predetermined range. According to this embodiment, the power generation capacity of the fuel cell 100 is high at the point where the predetermined time (t1) elapses, and therefore the fuel cell vehicle 10 can travel using power from the fuel cell 100 thereafter. As a result, the SOC of the secondary battery 130 can be maintained within the predetermined range.

Figure 10:
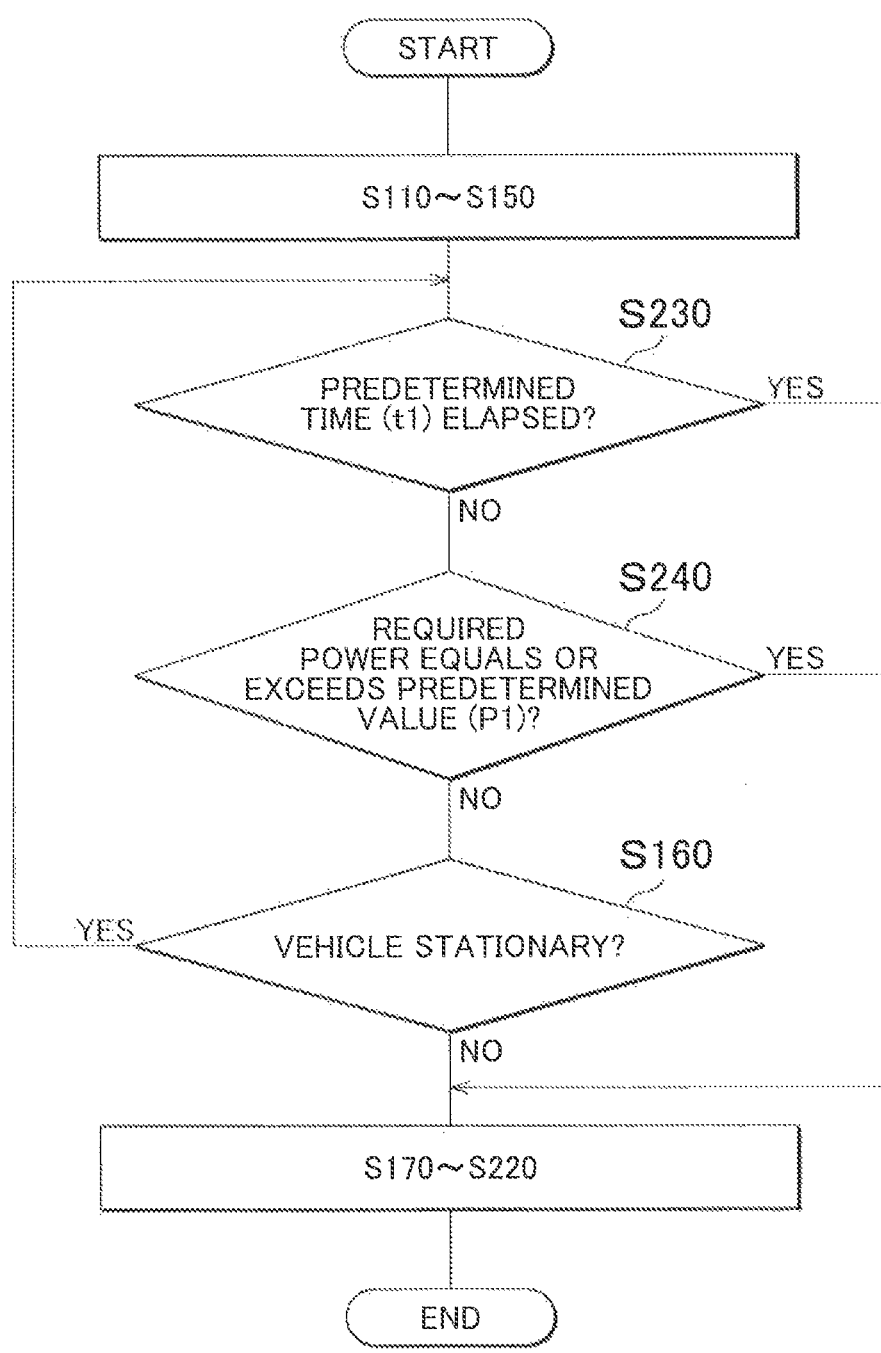
FIG. 10 is a flowchart showing control for discharging hydrogen from the cathode according to a third embodiment.

Next, a third embodiment will be described. FIG. 10 is a flowchart showing control for discharging hydrogen from the cathode according to the third embodiment. The third embodiment differs from the second embodiment in that step S240 is inserted between step S230 and step S160. In step S240, the control unit 110 determines whether or not a required power (a required load) of the fuel cell vehicle 10 equals or exceeds a predetermined value. The required power of the fuel cell vehicle 10 equals or exceeds the predetermined value (a predetermined value (P1)) when, for example, a power consumption of an air conditioner (not shown) is large or the like. Note that when an amount of power stored in the secondary battery 130 is small, the control unit 110 may reduce the predetermined value (P1). When the required power of the fuel cell vehicle 10 equals or exceeds the predetermined value, the control unit 110 advances the processing to step S170 regardless of whether or not the predetermined time (t1) has elapsed after switching the starter switch 115 on and whether or not the fuel cell vehicle 10 is stationary.

FIGS. 11A to 11G are timing charts according to the third embodiment. In the third embodiment, the pump 320 is driven and the pressure regulating valve 420 is opened, whereby the amount of hydrogen retained in the cathode of the fuel cell 100 starts to decrease and the output of the fuel cell 100 starts to increase, at a point where the air conditioner is activated. Note that when the air conditioner is activated after the predetermined time (t1) elapses or after the fuel cell vehicle 10 starts to travel, the corresponding processing described in the second embodiment or the first embodiment is performed. With the third embodiment, as is evident from FIGS. 11A to 11G, the fuel efficiency can be improved in comparison with the comparative example. Further, when a load demand is issued to the power supply circuit (when a load is required of the power supply circuit), the fuel cell is caused to generate power, and therefore the SOC of the secondary battery can be maintained within the predetermined range.

Next, a fourth embodiment will be described. FIG. 12 is a flowchart showing control for discharging hydrogen from the cathode according to the fourth embodiment. In the first embodiment, the processing for discharging the hydrogen in the cathode of the fuel cell 100 is executed after the fuel cell vehicle 10 starts to travel, whereas in the fourth embodiment, the processing for discharging the hydrogen in the cathode of the fuel cell 100 is executed after the starter switch 115 is switched on. In comparison with the comparative example, however, the hydrogen discharge processing is performed slowly.

The processing of steps S100 to S140 is identical to the first embodiment. In step S250, the control unit 110 opens the flow dividing valve 460 so as to realize a predetermined ratio (4:96, for example) between the amount of air supplied to the fuel cell 100 and the amount of air flowing to the oxidant gas bypass pipe 450. The control unit 110 then opens the pressure regulating valve slightly in step S260, and drives the pump 320 in step S270. The rotation speed of the pump 320 is preferably set such that the noise vibration that accompanies rotation of the pump 320 does not exceed a predetermined value.

In step S280, the control unit 110 slowly increases the opening of the pressure regulating valve 420. The opening of the pressure regulating valve 420 is preferably increased at a lower speed than in step S180 of the first embodiment. As a result, the hydrogen in the cathode of the fuel cell 100 is discharged such that the output of the fuel cell gradually increases. In step S290, the control unit 110 determines whether or not the output of the fuel cell 100 has reached or exceeded a predetermined value. Similarly to the first embodiment, the control unit 110 determines whether or not the voltage per cell equals or exceeds 0.6 V. When the voltage per cell equals or exceeds 0.6 V, the control unit 110 advances the processing to step S200.

When the output of the fuel cell 100 has not reached or exceeded the predetermined value in step S290, the control unit 110 advances the processing to step S160. In step S160, the control unit 110 determines whether or not the fuel cell vehicle 10 is stationary. When the fuel cell vehicle 10 is stationary, the control unit 110 advances the processing to step S280, and when the fuel cell vehicle 10 is not stationary, or in other words when the fuel cell vehicle 10 has started to travel, the control unit 110 advances the processing to step S170. The processing of steps S170, S180, and S190 is identical to the first embodiment. In other words, similar processing to the first embodiment is performed after the fuel cell vehicle 10 starts to travel.

FIGS. 13A to 13G are timing charts according to the fourth embodiment. In the fourth embodiment, the processing for discharging the hydrogen in the cathode of the fuel cell 100 is executed after the starter switch 115 is switched on. In comparison with the comparative example, however, the hydrogen discharge processing is performed slowly. In comparison with the comparative example, therefore, the voltage generated by the fuel cell remains low until the fuel cell vehicle 10 starts to travel, and as a result, the power consumption is also small. Moreover, an amount by which the pump 320 is driven before the fuel cell vehicle 10 starts to travel is also small, which is advantageous in terms of noise vibration.

An embodiment of the invention was described above on the basis of several examples, but the above embodiment of the invention is provided merely for the purpose of facilitating understanding of the invention, and the invention is not limited thereto. This embodiment of the invention may be modified and improved without departing from the concept of the invention and the scope of the claims, and these equivalent embodiments are included in the invention.

What is claimed is:

1. A fuel cell system used in a fuel cell vehicle, comprising:
a power supply circuit including a fuel cell and a secondary battery;
an oxidant gas supply flow passage used to supply an oxidant gas to a cathode of the fuel cell;
a pump that compresses the oxidant gas and supplies the compressed oxidant gas to the cathode, the pump being provided in the oxidant gas supply flow passage; and
a control unit configured to drive the pump and dilute hydrogen retained in the cathode, wherein
the control unit is configured to stop supplying the oxidant gas to the cathode by stopping an operation of the pump such that dilution of the hydrogen retained in the cathode is stopped, while the fuel cell vehicle remains stationary after a starter switch of the fuel cell vehicle is switched from an off state to an on state, or while a load required of the power supply circuit remains smaller than a predetermined value after the starter switch of the fuel cell vehicle is switched from the off state to the on state.

2. The fuel cell system according to claim 1, wherein the control unit is configured to supply the oxidant gas to the cathode such that the hydrogen retained in the cathode is diluted and discharged from the cathode, when a predetermined time elapses after the starter switch of the fuel cell vehicle is switched from the off state to the on state, even when the fuel cell vehicle has not yet started to travel.

3. The fuel cell system according to claim 1, wherein the control unit is configured to supply the oxidant gas to the cathode such that the hydrogen retained in the cathode is diluted and discharged from the cathode, when a load demand is issued to the power supply circuit after the starter switch of the fuel cell vehicle is switched from the off state to the on state, even when the fuel cell vehicle has not yet started to travel.

4. A fuel cell vehicle characterized by comprising the fuel cell system according to claim 1.

5. A control method for a fuel cell system used in a fuel cell vehicle, the fuel cell system including:
a power supply circuit including a fuel cell and a secondary battery;
an oxidant gas supply flow passage used to supply an oxidant gas to a cathode of the fuel cell;
a pump that compresses the oxidant gas and supplies the compressed oxidant gas to the cathode, the pump being provided in the oxidant gas supply flow passage; and
a control unit configured to drive the pump and dilute hydrogen retained in the cathode,
the control method comprising stopping supplying the oxidant gas to the cathode by stopping an operation of the pump such that dilution of the hydrogen retained in the cathode is stopped, while the fuel cell vehicle remains stationary after a starter switch of the fuel cell vehicle is switched from an off state to an on state, or while a load required of the power supply circuit remains smaller than a predetermined value after the starter switch of the fuel cell vehicle is switched from the off state to the on state.

6. The fuel cell system according to claim 2, wherein the predetermined time is set based on an operation history of the fuel cell vehicle.

7. The fuel cell system according to claim 1, wherein the control unit is configured to, after the starter switch is switched on, drive the pump and open a pressure regulating valve for a fixed period such that negative pressure in the cathode of the fuel cell turns into positive pressure, and then to stop the pump.

8. The fuel cell system according to claim 1 further comprising:
a flow dividing valve configured to adjust an amount of oxidant gas flowing to an oxidant gas bypass pipe and an amount of oxidant gas flowing to the fuel cell, wherein the control unit is configured to adjust an opening of the flow dividing valve such that the amount of oxidant gas flowing to the oxidant gas bypass pipe is larger than the amount of oxidant gas flowing to fuel cell.

9. The fuel cell system according to claim 8, wherein the control unit is configured to, after the fuel cell vehicle starts to travel, drive the pump and gradually open a pressure regulating valve, and is configured to, after a voltage per cell equals or exceeds a predetermined voltage, control the pump, the pressure regulating valve and the flow dividing valve in accordance with a load required of the fuel cell.

10. The fuel cell system according to claim 1, wherein the pump provides a first flow rate when negative pressure in the cathode is turned to positive pressure, and a second flow rate when a normal operation is underway in the fuel cell vehicle, the first flow rate being set at a smaller value than the second flow rate.

* * * * *